United States Patent
Hamers et al.

(10) Patent No.: US 7,490,712 B2
(45) Date of Patent: Feb. 17, 2009

(54) CONVEYOR ASSEMBLY WITH EJECTING PROVISION, A DOCUMENT PROCESSING LINE PROVIDED WITH SUCH A CONVEYOR ASSEMBLY, AND A METHOD OF EJECTING PRODUCTS

(75) Inventors: Ludovicus Wilhelmus A. Hamers, Westzaan (NL); Menno Koppen, Hilversum (NL); Freek Willem L. De Ridder, Heemstede (NL); Bernardus Cornelis Tichelaar, Zaandam (NL)

(73) Assignee: Buhrs-Zaandam B.V., Zaandam (NL)

( * ) Notice: Subject to any disclaimer, the term of this patent is extended or adjusted under 35 U.S.C. 154(b) by 0 days.

(21) Appl. No.: 11/802,500

(22) Filed: May 23, 2007

(65) Prior Publication Data

US 2007/0272514 A1 Nov. 29, 2007

(30) Foreign Application Priority Data

May 23, 2006 (NL) .................................... 1031861

(51) Int. Cl.
*B65G 21/14* (2006.01)
(52) U.S. Cl. ...................... 198/588; 198/594; 198/369.7
(58) Field of Classification Search .............. 198/369.1, 198/588, 594, 812
See application file for complete search history.

(56) References Cited

U.S. PATENT DOCUMENTS

| 4,166,525 A | 9/1979 | Bruno | |
| 5,088,592 A * | 2/1992 | Palmers | 198/812 |
| 6,866,135 B2 * | 3/2005 | Quadracci et al. | 198/369.7 |
| 2004/0168886 A1 | 9/2004 | Quadracci et al. | |

FOREIGN PATENT DOCUMENTS

| DE | 4213201 | * 10/1993 | 198/396.7 |
| EP | 0 124 177 A1 | 11/1984 | |
| EP | 0 463 610 A2 | 1/1992 | |
| FR | 2 377 938 A1 | 8/1978 | |

* cited by examiner

Primary Examiner—James R Bidwell
(74) Attorney, Agent, or Firm—Birch, Stewart, Kolasch & Birch, LLP

(57) ABSTRACT

A conveyor assembly with ejecting provision, wherein the assembly comprises an upstream and a downstream belt conveyor defining a conveying surface, which are arranged for operatively conveying a series of products at a conveying speed in a conveying direction, wherein the upstream belt conveyor connects by a discharge end to a feed end of the downstream belt conveyor, wherein the discharge end is defined by a discharge end return pulley and wherein the feed end is defined by a feed end return pulley, wherein the discharge end return pulley and/or the feed end return pulley are arranged displaceably along the conveying direction in a plane parallel to the conveying surface of the respective conveyor for forming an ejection opening between the two return pulleys. The invention further relates to a document processing line with such a conveyor assembly and to a method of ejecting products.

18 Claims, 3 Drawing Sheets

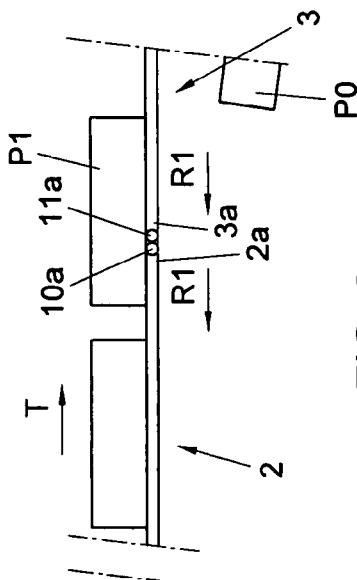
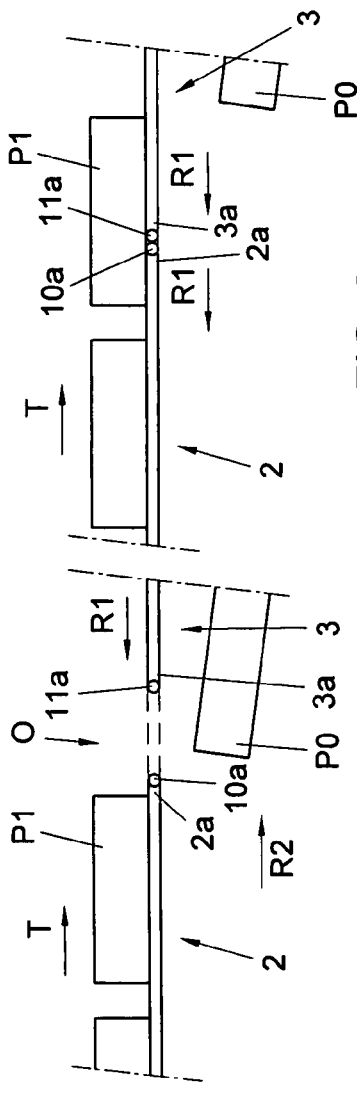
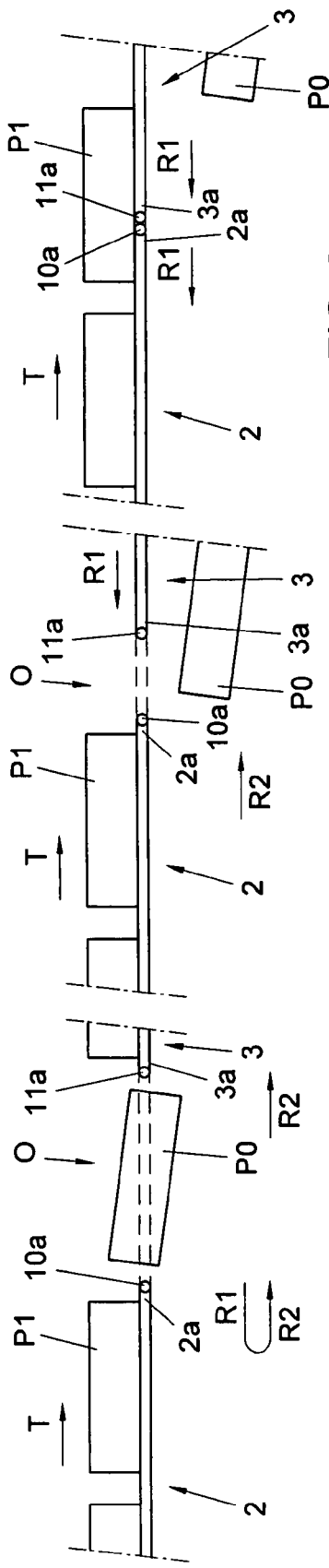
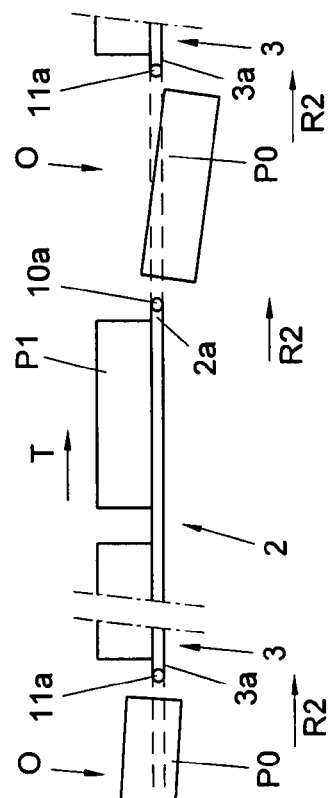
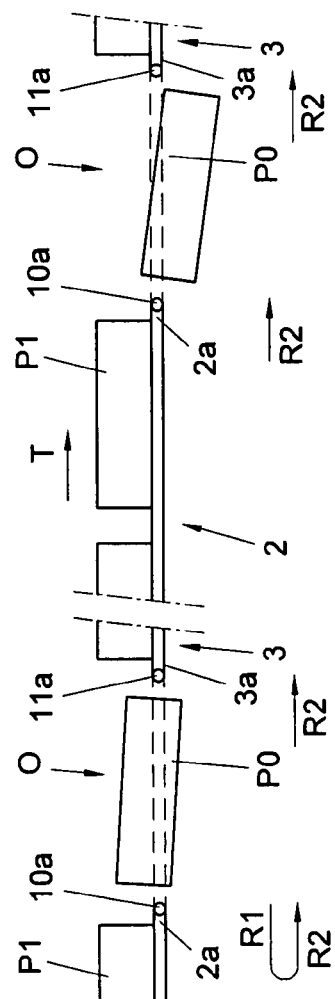
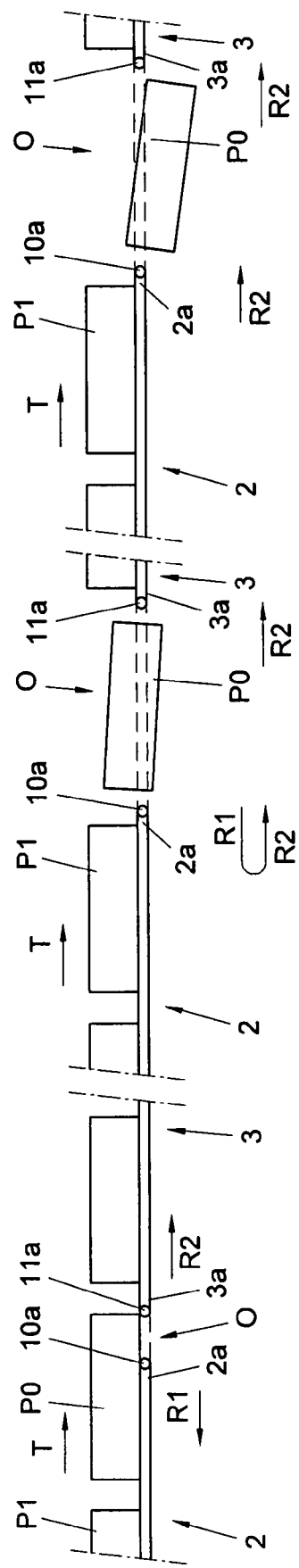

CONVEYOR ASSEMBLY WITH EJECTING PROVISION, A DOCUMENT PROCESSING LINE PROVIDED WITH SUCH A CONVEYOR ASSEMBLY, AND A METHOD OF EJECTING PRODUCTS

The invention relates to a conveyor assembly with ejecting provision, wherein the assembly comprises an upstream and a downstream belt conveyor defining a conveying surface, which are arranged for operatively conveying a series of products at a conveying speed in a conveying direction.

Such a conveyor assembly with ejecting provision is known from practice. The known conveyor assembly comprises a conveyor over which products are conveyable. The products may be all kinds of products. The known conveyor assembly is provided with a switch provided with a conveyor belt which, in non-ejecting condition, forms a connection between an upstream and downstream belt conveyor, and which, in ejecting condition, is pivoted away in downward or upward direction. As a result, the product to be ejected falls through the opening or is transferred to a discharge conveyor and has thus left the conveyor belt. Such conveyor assemblies may be used in, for instance, product processing lines for ejecting products which do not meet the production requirements. For instance, these products may be packaged wrongly, damaged or otherwise deviate from the norm.

However, such conveyor assemblies have the drawback that, because the products are conveyed over the conveyors at a very high speed, for instance at a speed of 15,000-18,000 items per hour, it is difficult to pivot away and pivot back the switch at the right moment. It occurs that, when the switch has been pivoted away, due to the speed, in horizontal direction, the product moves over the opening and does not fall down. In such a situation, it is necessary to push the product downwards with, for instance, an element provided on the conveyor assembly for that purpose. Also, the timing for pivoting away and pivoting back the switch may cause stoppages because the product may end up between the switch and the conveyors. Because the switch pivots back too slowly, a following product may also be hindered by the switch not being brought back into closed condition, for instance by getting stuck in the opening still present. If the switch is not pivoted away at the right moment, the product to be ejected may fall through the opening in a wrong manner so that the ejected products are not ejected in a desired manner.

The invention therefore contemplates providing a conveyor assembly with ejecting provision which is suitable for ejecting products, wherein the conveyor assembly prevents products from being ejected wrongly, becoming stuck, disturbing the production process or otherwise causing delay during the processing.

To this end, the invention provides a conveyor assembly with ejecting provision according to the type described in the introduction, wherein the upstream belt conveyor connects by a discharge end to a feed end of the downstream belt conveyor, wherein the discharge end is defined by a discharge end return pulley and wherein the feed end is defined by a feed end return pulley, wherein the discharge end return pulley and/or the feed end return pulley are arranged displaceably along the conveying direction of the conveyors in a plane parallel to the conveying surface of the respective conveyor for forming an ejection opening between the two return pulleys. Because the discharge end return pulley and the feed end return pulley are arranged displaceably and, as a result, the ejection opening is formable, the conveyor assembly does not comprise any separate moving parts such as a switch for forming and closing an ejection opening. With such a relatively simple configuration of the conveyor assembly, at least on the side of the conveying surface of the conveyors of the conveyor assembly, unnecessary disruption of the processing process of products is prevented.

According to a further elaboration of the invention, each of the above-mentioned displaceable return pulleys has a controllable drive for the displacement thereof, while the conveyor assembly is provided with a control for controlling the displacement of the two return pulleys, while the control is arranged for making both the discharge end return pulley and the feed end return pulley travel a displacement path for forming the ejection opening. In this manner, the ejection opening can be formed at any desired moment, depending on how the control controls the drives. Also, the ejection opening may be formed in different positions with respect to the conveyors by making the discharge end return pulley and the feed end return pulley travel different displacement paths. It is particularly favorable if, according to a further elaboration of the invention, the control regulates the displacement paths such that the ejection opening operatively moves along with a product to be ejected. The control can control the drives exactly at the desired moment so that the ejection opening is formed at a point in time to be determined accurately, and that the ejection opening is displaced over a displacement distance to be determined accurately and at an accurate displacement speed in the desired direction, the conveying direction of the product. As a result, during conveyance of the product to be ejected, the ejection opening is located near that product at all times. As a result, following products are not hindered by the ejection of a product to be ejected. Here, it is favorable if the control regulates the displacement paths such that, during closing of the ejection opening, the discharge end return pulley remains downstream of the centre of gravity of a product following the just ejected product at least until the feed end return pulley has approached the discharge end return pulley so closely that it is below the following product. Here, it may also be favorable if, according to a further elaboration of the invention, the control regulates the displacement paths such that, during closing of the ejection opening, the discharge end return pulley remains downstream of a product following the just ejected product until the ejection opening is closed.

According to a further elaboration of the invention, the control is arranged for displacing the two return pulleys against the conveying direction during or after closing of the ejection opening formed earlier, until the two return pulleys are in a starting position again. As a result, for each product to be ejected, the return pulleys can travel the most favorable displacement paths, while the ejection opening is, each time, formed from a same starting position.

According to a further elaboration of the invention, the upstream belt conveyor is provided with a fixed frame with a fixed return pulley near the discharge end, while the above-mentioned displaceable discharge end return pulley is included in a displaceable return pulley frame in which a second return pulley is present, while the upstream conveyor belt is successively guided over the discharge end return pulley, the second return pulley and the fixed return pulley. By displacing the return pulley frame, displacement of the discharge end return pulley is brought about. Only a linear displacement of the return pulley frame in conveying direction or oppositely to the conveying direction results in the displacement path of the discharge return pulley. The same holds for the feed end return pulley of the downstream conveyor. To this end, according to a further elaboration of the invention, the downstream belt conveyor is provided with a fixed frame with a fixed return pulley near the feed end, while the above-mentioned displaceable feed end return pulley is included in a displaceable return pulley frame in which a second return pulley is present, while the downstream conveyor belt is successively guided over the feed end return pulley, the second return pulley and the fixed return pulley. Here, it is favorable if, according to a further elaboration of the invention, the discharge end return pulley displacement drive engages the return pulley frame of the upstream conveyor and if, according to a further elaboration of the invention, the feed end return pulley displacement drive engages the return pulley frame of the downstream conveyor.

According to an alternative elaboration of the invention, the conveyor assembly may be provided with a sensor for detecting product properties of products which are conveyed over the belt conveyors. According to a further elaboration of the invention, the control may then be arranged for controlling the discharge end return pulley displacement drive and the feed end return pulley displacement drive, respectively, depending on the product properties in order to control a moment of displacement and/or a displacement speed of the discharge end and/or feed end. As a result, the conveyor assembly with ejecting provision enables the forming of the ejection opening to take place completely automatically. On the basis of, for instance, dimensions or weight of the products, the control can control the drives. Thus, the timing of the forming of the ejection opening and the size of the product to be ejected through the ejection opening are taken into account by making the ejection opening larger or smaller. Different dimensions and other product properties may also have been programmed in the control and, also on the basis thereof, the control can pass on signals to the drives.

The invention further relates to a document processing line provided with an above-described conveyor assembly.

The invention further relates to a method of ejecting products where an above-described conveyor assembly is provided, where products are conveyed by the conveyor assembly and where products with particular characteristics are ejected via the ejection opening and products with other particular characteristics are transferred from the upstream conveyor to the downstream conveyor.

Such a document processing line and such a method of ejecting products offer the same advantages and favorable effects as those mentioned in the description of the ejection module.

Further elaborations of the invention are described in the subclaims and will hereinafter be explained in more detail, with reference to the drawings, where:

Figure 1:
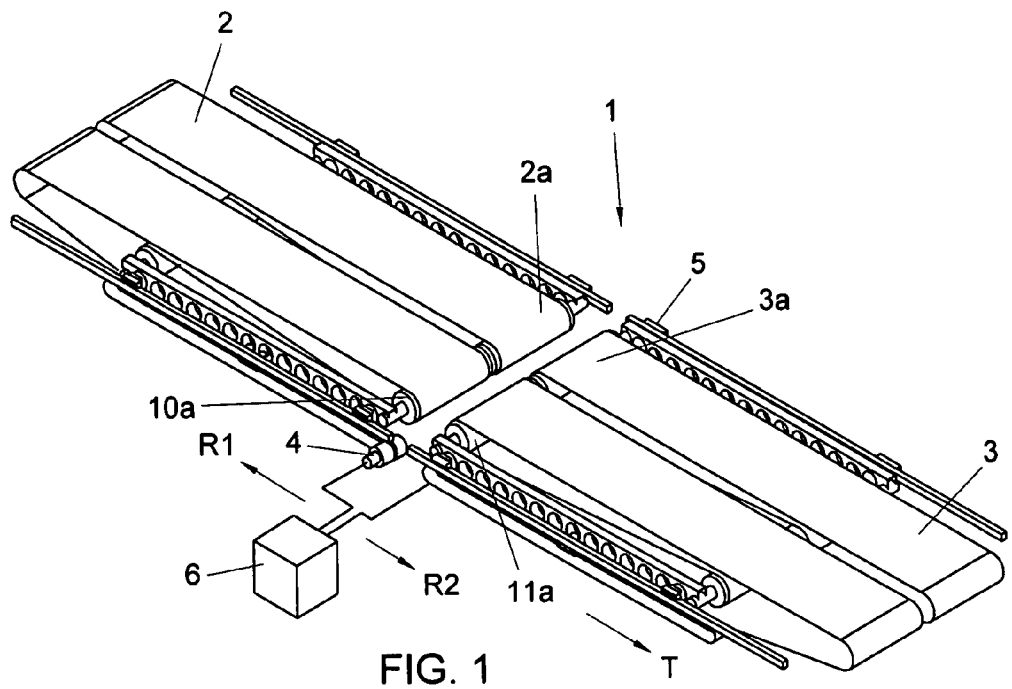
FIG. 1 shows a perspective view of the conveyor assembly.

FIGS. 6a-6f schematically show different steps in the ejection process.

It is noted that same reference numerals designate same parts in the different Figures.

FIG. 1 shows a conveyor assembly 1 with ejecting provision according to the invention. The conveyor assembly 1 is provided with an upstream and a downstream belt conveyor 2, 3 defining a conveying surface, which are arranged for operatively conveying a series of products P at a conveying speed in a conveying direction T. Products P may, for instance, be packaged documents in envelopes, magazines, documents packaged in film, loose documents and other similar products. Packages, such as books or similar products packaged in boxes, may also be processed with such a conveyor assembly 1. The upstream belt conveyor 2 connects by a discharge end 2a to a feed end 3a of the downstream belt conveyor 3. The discharge end 2a is defined by a discharge end return pulley 10a and the feed end 3a is defined by a feed end return pulley 11a. The discharge end return pulley 10a and/or the feed end return pulley 11a are arranged displaceably along the conveying direction T of the conveyors 2, 3 in a plane parallel to the conveying surface of the respective conveyor 2, 3 for forming an ejection opening O between the two return pulleys 10a, 11a. The ejection opening O is arranged for ejecting products P while the conveyance of the other products P over the conveyors 2, 3 continues. If a product P is not to be ejected, this product P is transferred from the upstream conveyor 2 to the downstream conveyor 3. Products P can be ejected if they deviate from the norm, for instance because the product P is folded, crumpled, is packaged wrongly or shows other similar deviations. Ejection for another reason, for instance separation into two classes of products P on the basis of a selection criterion, can also be brought about with the conveyor assembly 1 with ejecting provision. The formation of an ejection opening O is further explained with FIGS. 6a-6f.

Figure 2:
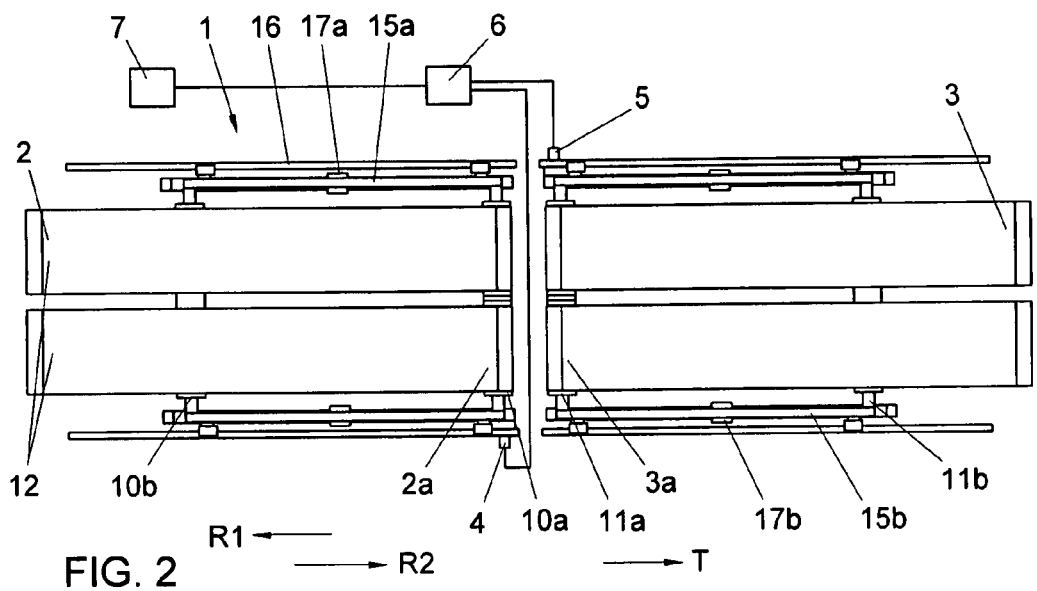
FIG. 2 shows a top plan view of the conveyor assembly.

FIG. 2 shows a top plan view of the conveyor assembly 1. The conveyor assembly 1 comprises, for each of the above-mentioned displaceable return 20 pulleys 10a, 11a, a controllable drive 4, 5 for displacement thereof. The conveyor assembly 1 is further provided with a control 6 for controlling the displacement of the two return pulleys 10a, 11a. The control 6 is arranged such that, for forming the ejection opening O, it can make both the discharge end return pulley 10a and the feed end return pulley 11a travel a displacement path. The control 6 can regulate these displacement paths such that the ejection opening O operatively moves along with a product P to be ejected. The drives 4, 5 can separately drive the discharge end return pulley 10a and the feed end return pulley 11a at a variable speed in a variable direction $R_1$ or $R_2$. FIGS. 1 and 2 schematically show that the conveyor assembly 1 has a control 6 for controlling the drives 4, 5. The control 6 is arranged for controlling the discharge end return pulley drive 4 for displacing the discharge end 2a of the upstream belt conveyor 2 oppositely to the conveying direction T, so in direction $R_1$; then for displacing the discharge end 2a at approximately conveying speed in the direction of the feed end 3a of the downstream belt conveyor 3 and finally for displacing the discharge end 2a oppositely to the conveying direction T until reaching the starting position.

Figure 5:
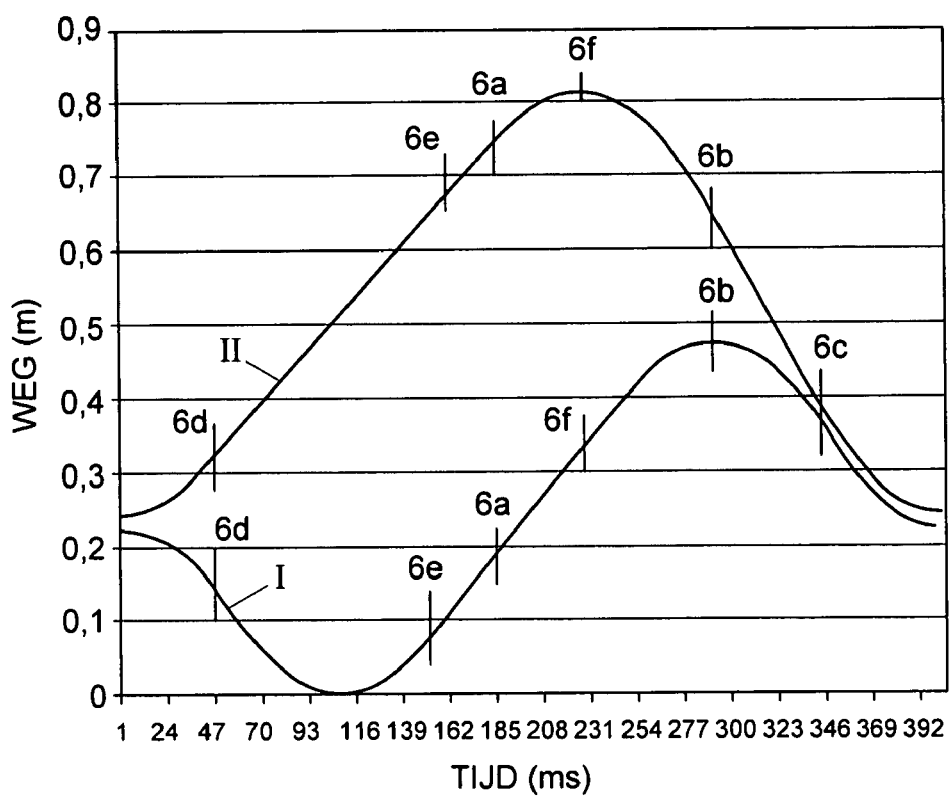
FIG. 5 shows a diagram of the displacement path of the discharge end return pulley and feed end return pulley in time.

In FIG. 5, the lower curve I shows the displacement of the discharge end 2a, and accordingly of the discharge end return pulley 10a, again shown in time. The curve II shows the displacement of the feed end 3a, and accordingly of the feed end return pulley 11a, in time. For realizing that displacement, the control 6 is arranged for controlling the feed end return pulley displacement drive 5 for displacing the feed end 3a of the downstream belt conveyor 3 in conveying direction T at approximately conveying speed followed by displacing the feed end 3a oppositely to the conveying direction T until reaching the starting position. The control 6 preferably ensures that the displacement of the discharge end return pulley 10a and the displacement of the feed end return pulley 11a start substantially simultaneously and end substantially simultaneously, as shown in FIG. 5. The result of this is that the ejection opening O moves, as it were, along with the product $P_1$ to be ejected. This is further elucidated with FIGS. 6a-6f.

FIG. 2 further shows that the conveyor assembly 1 may be provided with a sensor 7 for detecting product properties of products P conveyed over the belt conveyors 2, 3. The product properties may, for instance, be product dimensions or the weight of a product P. The sensor 7 may also detect numbers of products P which have passed. The control 6 can control the discharge end return pulley displacement drive 4 and the feed end return pulley displacement drive 5, respectively, depending on the product properties, so that the moment of displacement of both the discharge end return pulley 10a and the feed end return pulley 11a and the displacement speed can be controlled. The control 6 can decide on the basis of dimensions and/or weight that a product P needs to be ejected. To this end, the control 6 can compare the detected product properties with preprogrammed values. If the control 6 has decided that a product P needs to be ejected the control 6 can determine, on the basis of the dimensions of that product P, the displacement path of the discharge end return pulley 10a and the feed end return pulley 11a and the speed at which those displacement paths need to be traveled.

Figure 3:
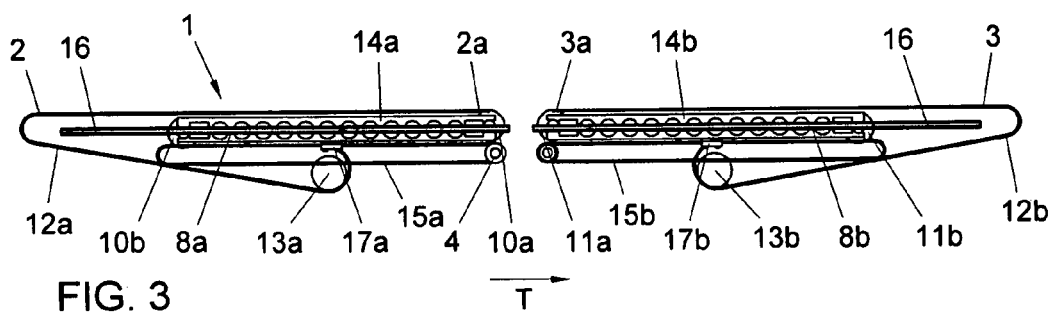
FIG. 3 shows a side elevational view of the conveyor assembly.

FIG. 3 shows that the upstream belt conveyor 2 is provided with a fixed frame 8a with a fixed return pulley 13a near the discharge end 2a. The displaceable discharge end return pulley 10a is included in a displaceable return pulley frame 14a, in which a second return pulley 10b is present. The upstream conveyor belt 12a is successively guided over the discharge end return pulley 10a, the second return pulley 10b and the fixed return pulley 13a. The downstream belt conveyor 3 is provided with a fixed frame 8b with a fixed return pulley 13b near the feed end 3a. The displaceable feed end return pulley 11a is included in a displaceable return pulley frame 14b, in which a second return pulley 11b is present. The downstream conveyor belt 12b is successively guided over the feed end return pulley 11a, the second return pulley 11b and the fixed return pulley 13b. The fixed frames 8a, 8b of both the upstream belt conveyor 2 and the downstream belt conveyor 3 are connected with a guide 16 which extends approximately parallel to the conveying direction T. The discharge end return pulley displacement drive 4 engages the return pulley frame 14a of the upstream conveyor 2, in this case by means of a fastening 17a. The feed end return pulley displacement drive 5 engages the return pulley frame 14b of the downstream conveyor 3, for instance with a fastening 17b.

Figure 4A:
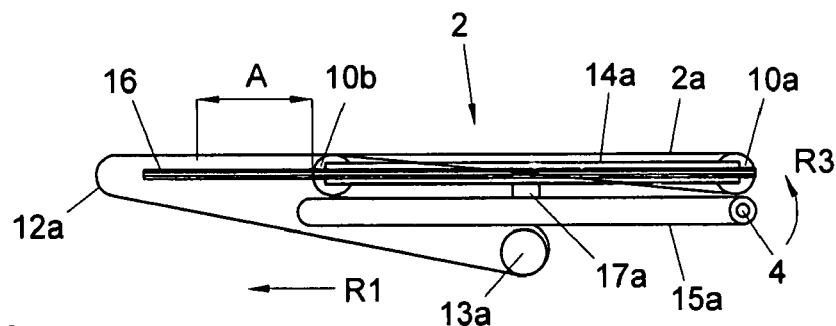
FIGS. 4a and 4b show side elevational views of a belt conveyor.
Figure 4B:
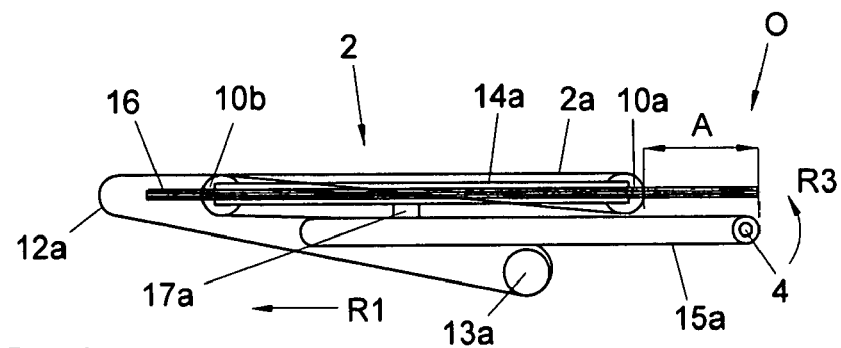

FIGS. 4a and 4b show how the actual displacement of, in this case, the discharge end 2a is brought about. When the discharge end return pulley displacement drive 4 receives a signal from the control (not shown), the discharge end return pulley displacement drive 4 will move the drive element 15a for instance in the direction $R_3$. The fastening 17a is moved in direction $R_1$ by the displacement of the drive element 15a. Since the fastening 17a is fixedly provided on the return pulley frame 14a, this frame including the return pulleys 10a, 10b is also moved in direction $R_1$. The return pulley frame 14a slides over the guide 16 so that the discharge end 2a is displaced in direction $R_1$ over a distance A so that, on the side of the discharge end 2a of the conveyor 2, a part of the ejection opening O is formed with length A. During this displacement, the conveyor belt 12a remains under tension. It will thus be clear how the displacement in opposite direction $R_2$ is brought about, and how the displacement of the feed end 3a of the downstream conveyor 3 is brought about.

FIGS. 6a-6f schematically show the method of ejecting a product P in steps. FIG. 5 shows, in the diagram, on the curves I and II, how discharge end 2a and the feed end 3a are positioned in FIGS. 6a-6f. In FIGS. 6a-6f, each time, it is indicated underneath the discharge end 2a and underneath the feed end 3a which displacement path was traveled by that respective end 2a, 3a and accordingly which displacement path was traveled by the discharge end return pulley 10a and feed end return pulley 11a compared to the previous Figure. FIGS. 6a-6c show a first ejection cycle of a product P and FIGS. 6d-f show a second cycle. FIGS. 6b and 6c show that the control (not shown) regulates the displacement paths of the respective ends 2a, 3a such that, during closing of the ejection opening O, the discharge end return pulley 10a remains downstream of the centre of gravity Z of a product $P_1$ following the just ejected product $P_0$, at least until the feed end return pulley 11a has approached the discharge end return pulley 10a so closely that it is below the following product $P_1$. In another embodiment of the invention, it is also possible that the control 6 regulates the displacement paths of the two ends 2a, 3a such that, during closing of the ejection opening, the discharge end return pulley 10a remains downstream of a product $P_1$ following the just ejected product $P_0$ until the ejection opening O has been closed.

Further, the control 6 is arranged to displace the two return pulleys 10a, 11a against the conveying direction T, in direction $R_1$, during or after closing of the ejection opening O formed earlier, until the two return pulleys 10a, 11b are in a starting position again.

FIGS. 6a-6c clearly show that, during ejection of product $P_0$, the following product $P_1$ is transferred from the upstream conveyor 2 to the downstream conveyor 3 at a constant speed without being hindered by the ejection of product $P_0$.

It will be clear that the invention is not limited to the exemplary embodiment described but that various modifications are possible within the framework of the invention, as defined by the claims. It is, for instance, possible that the conveying speed of the conveyors is changed. Logically, the control will adjust the control of the drives thereto. Also, for instance, the return pulley frame may be constructed in a different manner than described in this exemplary embodiment, but have a same operation as described. Further, the drive of the discharge end and of the feed end may be brought about in a different manner. Per conveyor, multiple conveyor belts may be provided next to one another and the conveyors may placed in the conveyor assembly at an angle of inclination, while the conveyor assembly operates in a same manner as in the exemplary embodiment described.

The invention claimed is:

1. A conveyor assembly with ejecting provision, wherein the assembly comprises an upstream and a downstream belt conveyor defining a conveying surface, which are arranged for operatively conveying a series of products at a conveying speed in a conveying direction, wherein the upstream belt conveyor connects by a discharge end to a feed end of the downstream belt conveyor, wherein the discharge end is defined by a discharge end return pulley and wherein the feed end is defined by a feed end return pulley, wherein the discharge end return pulley and/or the feed end return pulley are arranged displaceably along the conveying direction of the conveyors in a plane parallel to the conveying surface of the respective conveyor for forming an ejection opening between the two return pulleys wherein each of the said displaceable return pulleys has a controllable drive for the displacement thereof, wherein the conveyor assembly is provided with a control for controlling the displacement of the two return pulleys, wherein the control is arranged for making both the discharge end return pulley and the feed end return pulley travel a displacement path for forming the ejection opening, and wherein the control regulates the displacement paths such that the ejection opening operatively moves along with a product to be ejected.

2. A conveyor assembly according to claim 1, wherein the control regulates the displacement paths such that, during closing of the ejection opening, the discharge end return pulley remains downstream of the centre of gravity of a product following the just ejected product at least until the feed end return pulley has approached the discharge end return pulley so closely that it is below the following product.

3. A conveyor assembly according to claim 1, wherein the control regulates the displacement paths such that, during closing of the ejection opening, the discharge end return pulley remains downstream of a product following the just ejected product until the ejection opening is closed.

4. A conveyor assembly according to claim 1, wherein the control is arranged for, during or after closing of the ejection opening formed earlier, displacing the two return pulleys against the conveying direction, until the two return pulleys are in a starting position again.

5. A conveyor assembly according to claim 1, wherein the upstream belt conveyor is provided with a fixed frame with a fixed return pulley near the discharge end, wherein the said displaceable discharge end return pulley is included in a displaceable return pulley frame in which a second return pulley is present, wherein the upstream conveyor belt is successively guided over the discharge end return pulley, the second return pulley and the fixed return pulley.

6. A conveyor assembly according to claim 1, wherein the downstream belt conveyor is provided with a fixed frame with a fixed return pulley near the feed end, wherein the said displaceable feed end return pulley is included in a displaceable return pulley frame in which a second return pulley is present, wherein the downstream conveyor belt is successively guided over the feed end return pulley, the second return pulley and the fixed return pulley.

7. A conveyor assembly according to claim 5, wherein the discharge end return pulley displacement drive engages the return pulley frame of the upstream conveyor.

8. A conveyor assembly according to claim 6, wherein the feed end return pulley displacement drive engages the return pulley frame of the downstream conveyor.

9. A conveyor assembly according to claim 7, wherein the control is arranged for controlling the discharge end return pulley displacement drive for displacing the discharge end ($2a$) of the upstream belt conveyor ($2$) oppositely to the conveying direction, followed by displacing the discharge end at approximately conveying speed in the direction of the feed end of the downstream belt conveyor and finally displacing the discharge end oppositely to the conveying direction until reaching the starting position.

10. A conveyor assembly according to claim 8, wherein the control is arranged for controlling the feed end return pulley displacement drive for displacing the feed end of the downstream belt conveyor in conveying direction at approximately conveying speed, followed by displacing the feed end appositely to the conveying direction until reaching the starting position.

11. A conveyor assembly according to claim 9, wherein the control is arranged for substantially simultaneously starting and substantially simultaneously ending, respectively, the displacement of the discharge end and feed end.

12. A conveyor assembly according to claim 1, wherein the conveyor assembly is provided with a sensor for detecting product properties of products which are conveyed over the belt conveyors.

13. A conveyor assembly according to claim 12, wherein the control is arranged for controlling the discharge end return pulley displacement drive and the feed end return pulley displacement drive, respectively, depending on the product properties in order to control a moment of displacement and/or a displacement speed of the discharge end and/or feed end.

14. A document processing line provided with a conveyor assembly according to claim 1.

15. A method of ejecting products, wherein a conveyor assembly according to claim 1 is provided, wherein products are conveyed by the conveyor assembly and wherein products with particular characteristics are ejected via the ejection opening and products with other particular characteristics are transferred from the upstream conveyor to the downstream conveyor.

16. A conveyor assembly according to claim 1, wherein the control regulates the displacement paths such that, during closing of the ejection opening, the discharge end return pulley remains downstream of the centre of gravity of a product following the just ejected product at least until the feed end return pulley ($11a$) has approached the discharge end return pulley so closely that it is below the following product.

17. A conveyor assembly according to claim 1, wherein the control regulates the displacement paths such that, during closing of the ejection opening, the discharge end return pulley remains downstream of a product following the just ejected product until the ejection opening is closed.

18. A conveyor assembly according to claim 1, wherein the control is arranged for, during or after closing of the ejection opening formed earlier, displacing the two return pulleys against the conveying direction, until the two return pulleys are in a starting position again.

* * * * *